(12) United States Patent
Polito et al.

(10) Patent No.: US 9,551,386 B2
(45) Date of Patent: Jan. 24, 2017

(54) CENTRIFUGAL BRAKE FOR OVERSPEED PROTECTION

(75) Inventors: Benjamin Francis Polito, Gorham, ME (US); Keith Thomas Richtman, Boston, MA (US); Joshua Daniel Kaufman, Gorham, ME (US)

(73) Assignee: Pika Energy LLC, Westbrook, ME (US)

( * ) Notice: Subject to any disclaimer, the term of this patent is extended or adjusted under 35 U.S.C. 154(b) by 454 days.

(21) Appl. No.: 13/885,544

(22) PCT Filed: Nov. 15, 2011

(86) PCT No.: PCT/US2011/060871
§ 371 (c)(1),
(2), (4) Date: Aug. 6, 2013

(87) PCT Pub. No.: WO2012/068173
PCT Pub. Date: May 24, 2012

(65) Prior Publication Data
US 2013/0313054 A1    Nov. 28, 2013

Related U.S. Application Data

(60) Provisional application No. 61/413,939, filed on Nov. 15, 2010.

(51) Int. Cl.
*F16D 51/12* (2006.01)
*F16D 51/16* (2006.01)
(Continued)

(52) U.S. Cl.
CPC ............. *F16D 51/12* (2013.01); *F03D 7/0248* (2013.01); *F16D 51/16* (2013.01);
(Continued)

(58) Field of Classification Search
CPC .................... F16D 2127/002; F16D 2127/005; F16D 2127/02; F16D 2129/043; F16D 51/12; F03D 7/0248
See application file for complete search history.

(56) References Cited

U.S. PATENT DOCUMENTS 2,517,135 A    8/1950   Rudisill
2,950,121 A *  8/1960   Fisher ...................... A63H 3/28
                                                    16/35 R
(Continued)

FOREIGN PATENT DOCUMENTS

DE             2147669 A1     4/1972
JP             S58185980 A    10/1983
WO      WO-2012068173 A2      5/2012

OTHER PUBLICATIONS

"International Application Serial No. PCT/US2011/060871, International Preliminary Report on Patentability mailed Jun. 6, 2013", 7 pgs.
(Continued)

*Primary Examiner* — Bradley King
(74) *Attorney, Agent, or Firm* — Schwegman Lundberg & Woessner, P.A.

(57) ABSTRACT

A centrifugally triggered brake mechanism is used to halt a rotating assembly. The brake mechanism includes a braking surface, a brake shoe, and a rotating centrifugal trigger. Upon attaining a selected rotational speed the trigger releases the brake pad to engage the drum. The mechanism may be useful for instance in providing backup overspeed protection for wind turbines.

8 Claims, 8 Drawing Sheets

(51) Int. Cl.
*F03D 7/02* (2006.01)
*F16D 127/00* (2012.01)
*F16D 129/04* (2012.01)

(52) U.S. Cl.
CPC .. *F16D 2127/002* (2013.01); *F16D 2127/008* (2013.01); *F16D 2129/043* (2013.01); *Y02E 10/723* (2013.01)

(56) References Cited

U.S. PATENT DOCUMENTS

| | | | | |
|---|---|---|---|---|
| 4,905,797 | A | * | 3/1990 | Mueller .................. F16D 51/26 188/184 |
| 5,277,078 | A | * | 1/1994 | Osborn .................. F16H 59/10 267/158 |
| 5,310,022 | A | | 5/1994 | Sheridan et al. |
| 5,682,789 | A | * | 11/1997 | DeCrouppe ......... F16H 59/0204 74/335 |
| 5,904,229 | A | * | 5/1999 | Timari .................... B66B 5/04 187/305 |
| 9,056,753 | B2 | * | 6/2015 | Luntz .................... B66D 3/046 |
| 2004/0262109 | A1 | * | 12/2004 | Timtner ................ B66B 5/044 188/377 |
| 2006/0263220 | A1 | | 11/2006 | Russ |
| 2011/0169268 | A1 | * | 7/2011 | Wei ...................... F03D 7/0248 290/55 |

OTHER PUBLICATIONS

"International Application Serial No. PCT/US2011/060871, International Search Report mailed May 10, 2013", 5 pgs.
"International Application Serial No. PCT/US2011/060871, Written Opinion mailed May 10, 2103", 5 pgs.
"Machine Translation of DE 2147669A1 published Apr. 20, 1972", (Description and Claims), 4 pgs.

\* cited by examiner

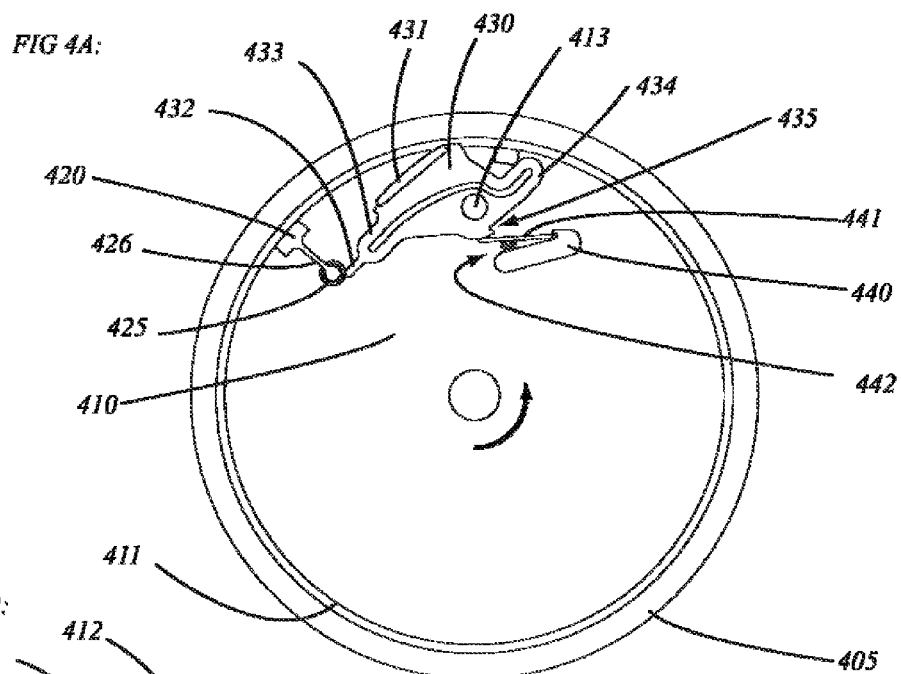
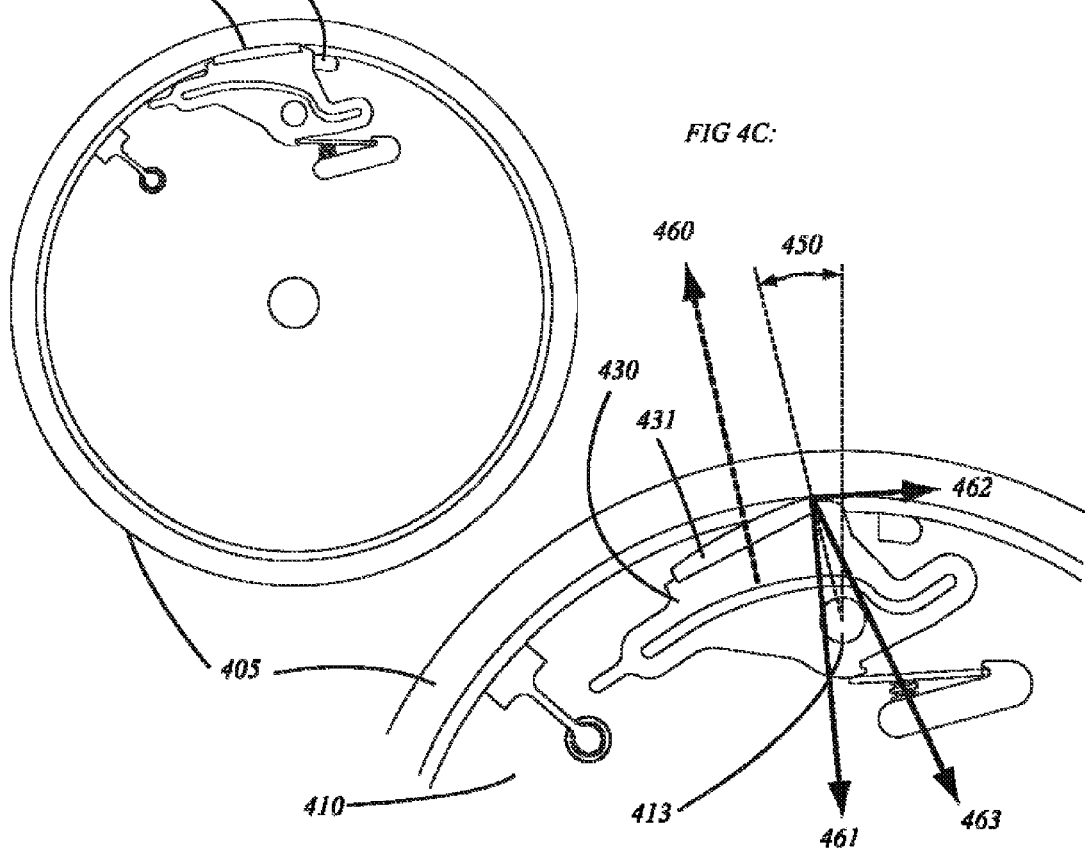

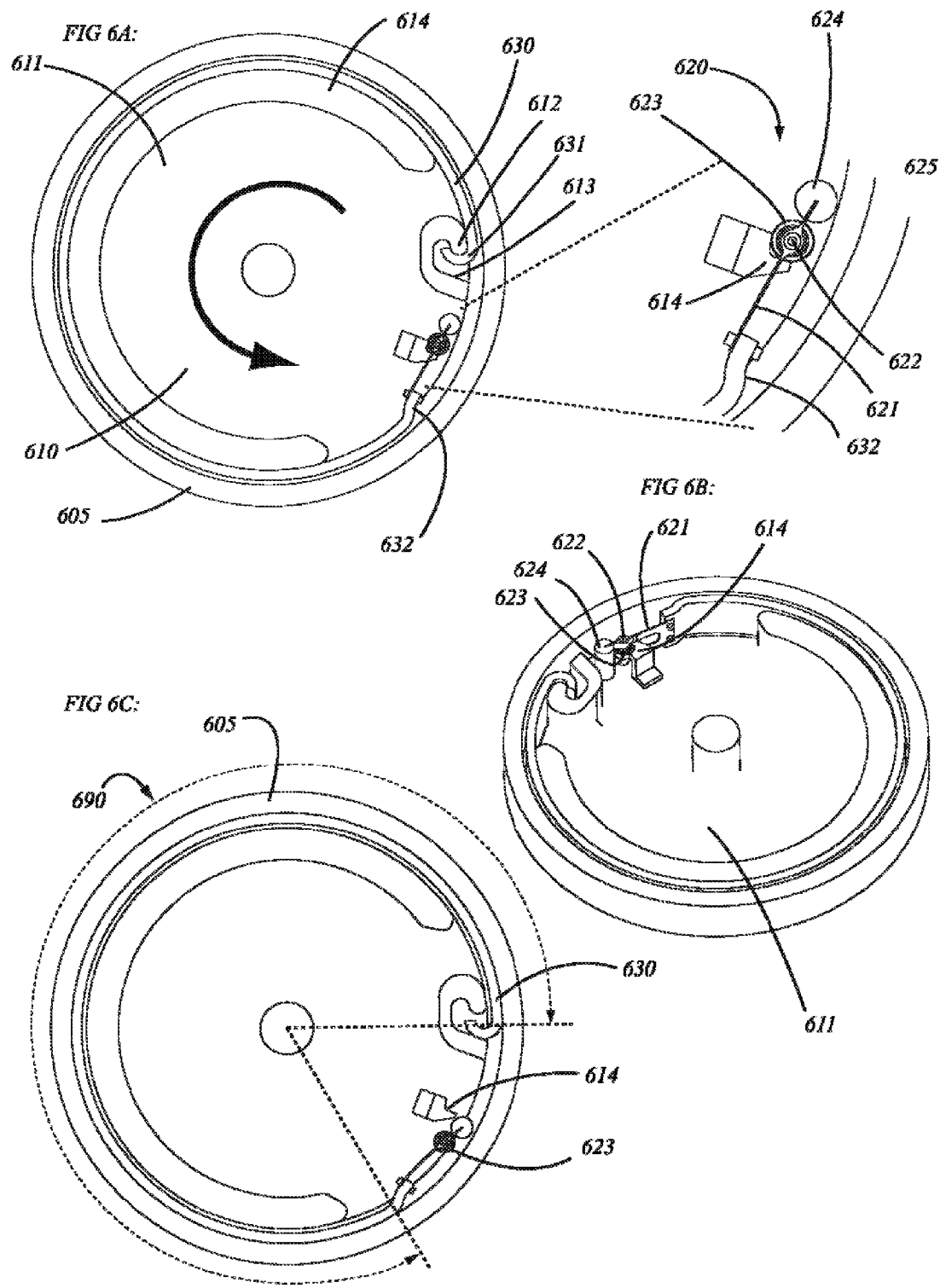

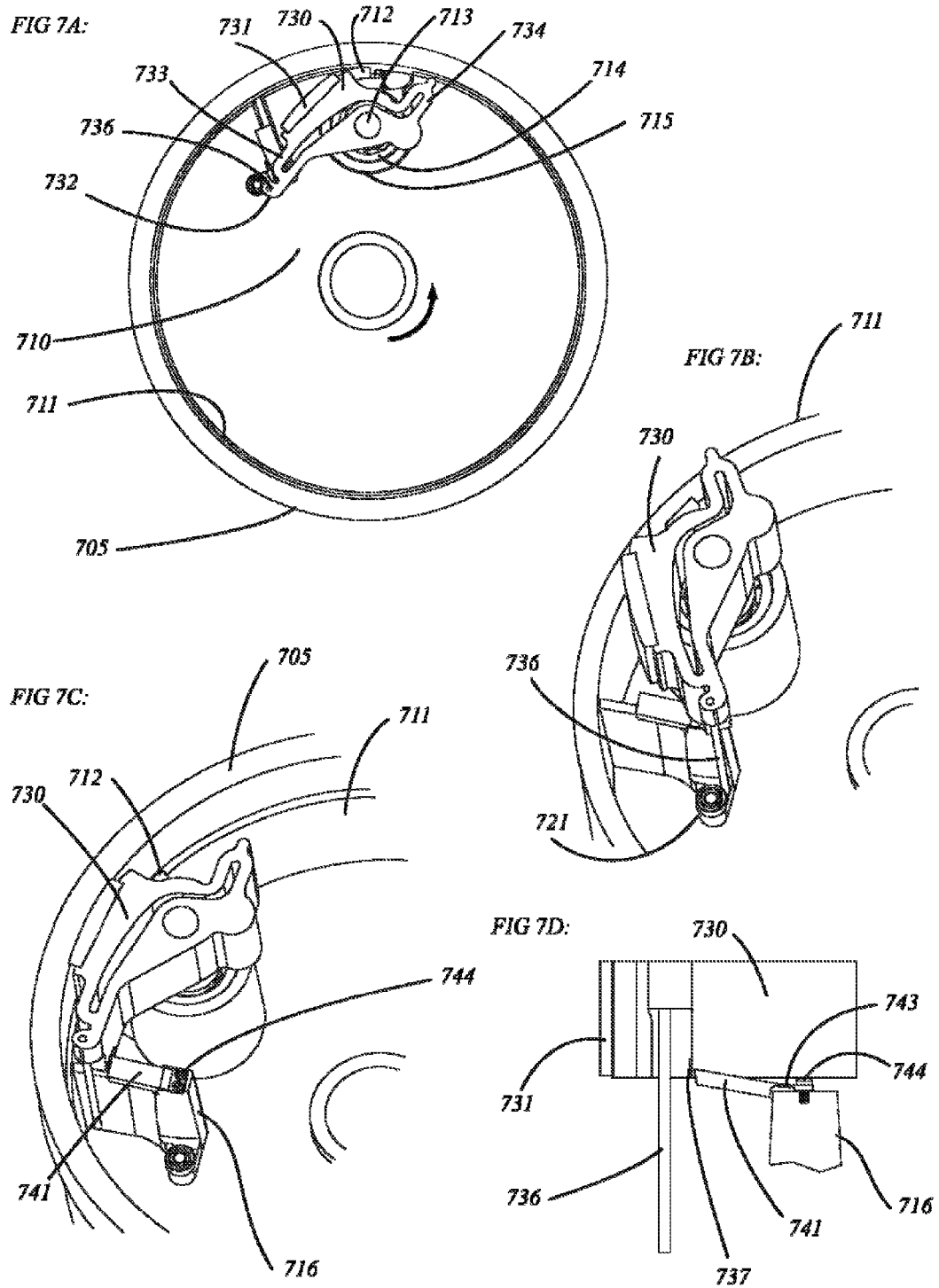

CENTRIFUGAL BRAKE FOR OVERSPEED PROTECTION

RELATED APPLICATION

This application is a national stage application under 35 U.S.C. §371 of PCT/US2011/060871, filed on Nov. 15, 2011, and published as WO 2012/068173 A2 on May 24, 2012, which claims priority to U.S. Provisional Application Ser. No. 61/413,939 (entitled Centrifugal Brake for Overspeed Protection, filed Nov. 15, 2010) which are incorporated herein by reference.

BACKGROUND

Prevention of a rotor overspeed condition in wind turbines is an important consideration in designing a commercial wind turbine for reliable operation. Under normal operating conditions, the rate of energy capture by the aerodynamic rotor assembly of a wind turbine is balanced by the rate of conversion to electrical energy in the generator, resulting in controlled shaft speed. However, a number of conditions may occur which render this control inadequate, if a fault occurs in the generator or associated power conversion apparatus, the electromechanical load on the rotor assembly may be suddenly lost, resulting in rapid acceleration of the rotating apparatus to unsafe speeds. Alternatively, very high winds may occur, resulting in input power in excess of the power rating of the generator.

Turbines are typically designed to limit aerodynamic input power and rotor speed in high winds. Large megawatt-scale turbines typically accomplish this by pitching the blades. Home-scale turbines often limit power in high winds by arranging for the entire rotor assembly to rotate passively away from the incoming flow—termed furling.

An alternative means of limiting power and preventing overspeed is to modulate the torque of the generator to induce aerodynamic stall in high winds. This method is used on small commercial turbines, but renders the turbine vulnerable to failures in the generator, which may result in an uncontrolled overspeed condition and likely structural failure. On larger turbines, active, releasable mechanical brakes are employed to back up the primary control method, but conventional mechanical brake assemblies may be cost prohibitive on smaller turbines.

SUMMARY

A centrifugally triggered brake mechanism is used to halt a rotating assembly. The brake mechanism includes a braking surface, a brake shoe, and a rotating centrifugal trigger. Upon attaining a desired rotational speed the trigger releases the brake pad to engage the drum.

BRIEF DESCRIPTION OF THE DRAWINGS

FIGS. 4A, 4B, and 4C are axial views showing a similar single-acting rotary drum brake, the shoe further comprising a flexure to improve control over the braking torque provided by the assembly according to an example embodiment.

FIGS. 6A, 6B, and 6C are axial and perspective views showing aspects of a single-acting rotary drum brake with a shoe in the form of a broken ring, the shoe capable of springing elastically outward to engage the drum upon release by a centrifugal trigger according to an example embodiment.

FIGS. 7A, 7B, 7C, and 7D are top and top perspective views of an alternative single acting drum brake according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1A:
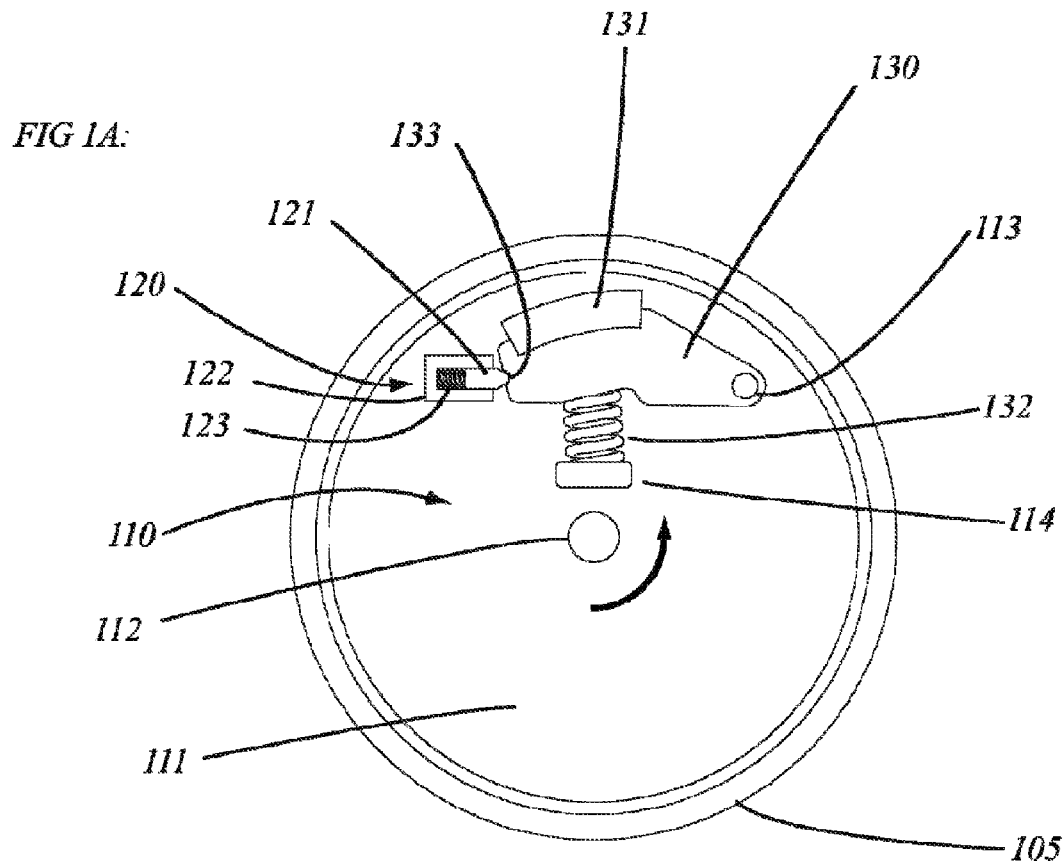
FIGS. 1A and 1B are axial views showing a single-acting rotary drum brake with a shoe that is urged against a drum by a spring, once released by a trigger assembly according to an example embodiment.
Figure 1B:
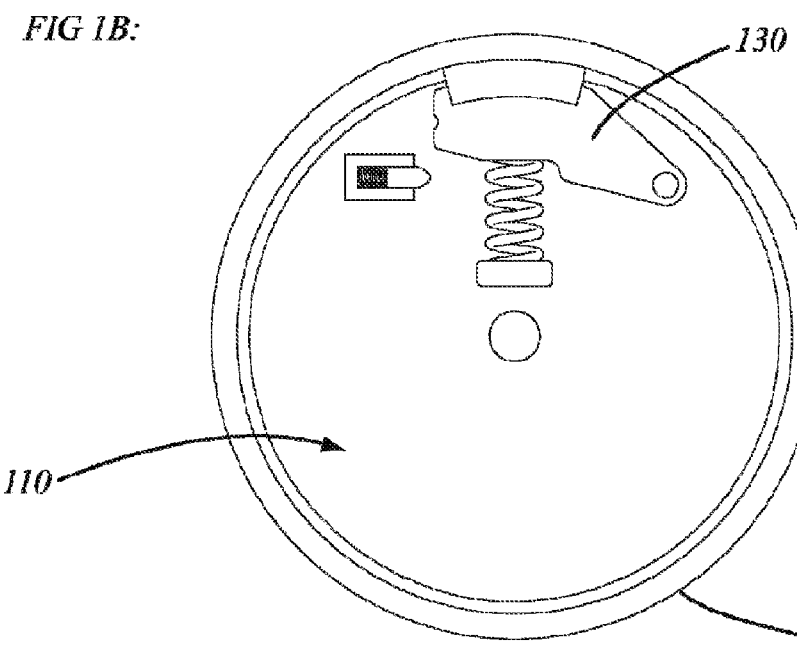

In one embodiment, a single-acting drum brake is illustrated in FIGS. 1A and 1B. The drum brake includes a stationary cylindrical drum 105 and a rotating assembly 110 constrained to rotate about an axis coaxial with the axis of the drum 105. The rotating assembly includes a chassis 111 with central shaft or journal 112, and carries a trigger assembly 120, and a brake shoe 130, pivotably Coupled to the Chassis at pin 113. The shoe may optionally carry a pad 131 of composite brake liner or other suitable material on its outer surface. The drum and shoe may each be referred to as braking surfaces. As used herein, the term 'shoe' is used broadly, to describe a moveable element or assembly that presents a braking suffice, and may be configured or adapted to perform additional functions as well.

In the 'cocked' state in FIG. 1A, the shoe is urged radially outwards toward the drum by a strong spring 132, but prevented from engaging the shoe by trigger pin 121, which is slidably constrained by trigger housing 122 and urged by spring 123 to engage detent 133 on the shoe. At rest, the force in spring 132 is overbalanced by the detent force of the trigger pin 121 in the detent, and the shoe is held in the radially inward, cocked or armed, position. As the assembly 110 is rotated at a steadily increasing speed, the radial force on the trigger pin 121 increases in proportion to the square of the angular velocity of the assembly, due to the centripetal acceleration of the shoe. At the desired engagement speed of the brake, the combined force arising from the spring 132 and from the centripetal acceleration of the shoe 130 together overcome the detent force of the trigger pin, allowing the spring 132 to force the shoe 130 outward about pivot 113, into the 'engaged' configuration shown in FIG. 1B. In the engaged position, the shoe 130 or shoe pad 131 if present, contacts the drum 105 and slows the rotating assembly 110 by mechanical friction. The brake will then remain in the engaged configuration until it is inspected and reset by an operator. The operator may reset the brake by forcing shoe 130 back into the cocked position.

The desired or selected engagement speed may be modified in several ways. The detent force may be modified by varying the depth or shape of the detent 133. A deeper detent may result in a higher engagement speed. Similarly, the trigger pin 121 may be more heavily spring loaded, for instance by increasing the spring constant of spring 123, to increase the engagement speed. The engagement speed may also be increased by reducing the weight of the shoe 130 or decreasing the spring constant of spring 132. In any event, the spring constant of the spring 132 should be sufficient to provide adequate force on the shoe 130, such that the brake provides sufficient torque to stop the rotating assembly 110 when shoe 130 engages drum 105.

Figure 2A:
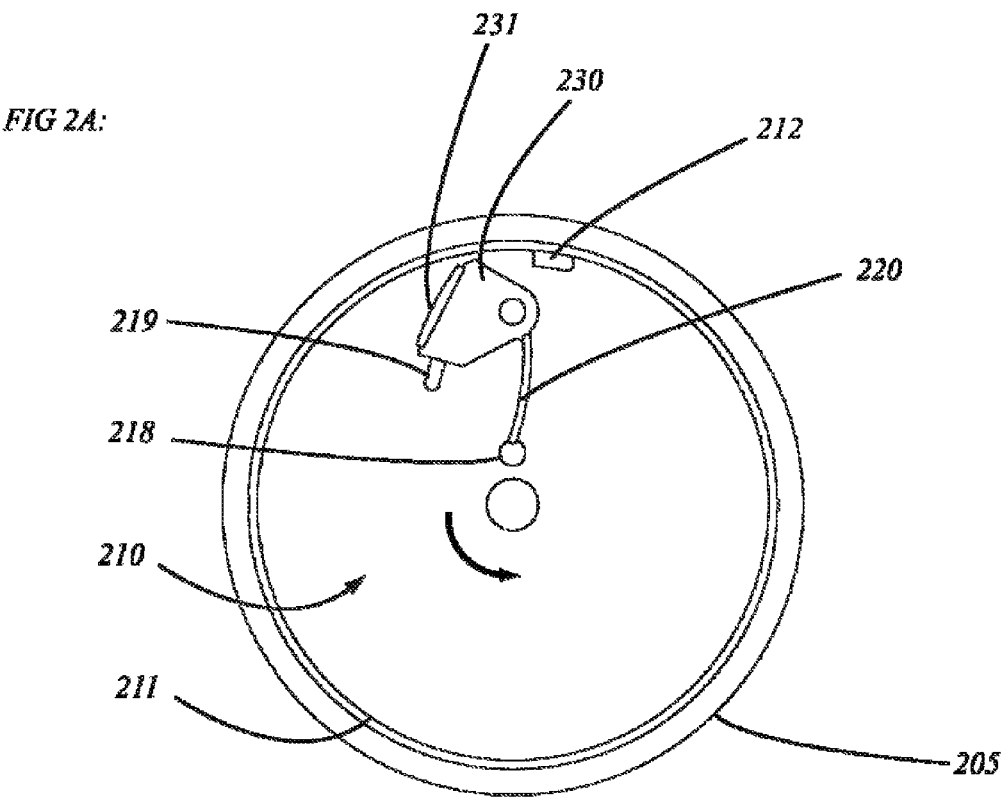
FIGS. 2A and 2B are axial views showing a single-acting rotary drum brake with a shoe that is restrained, by a trigger mechanism comprising a plate or strut in axial compression, said plate deforming at high rotation rates, thereby permitting the shoe to engage the drum according to an example embodiment.
Figure 2B:
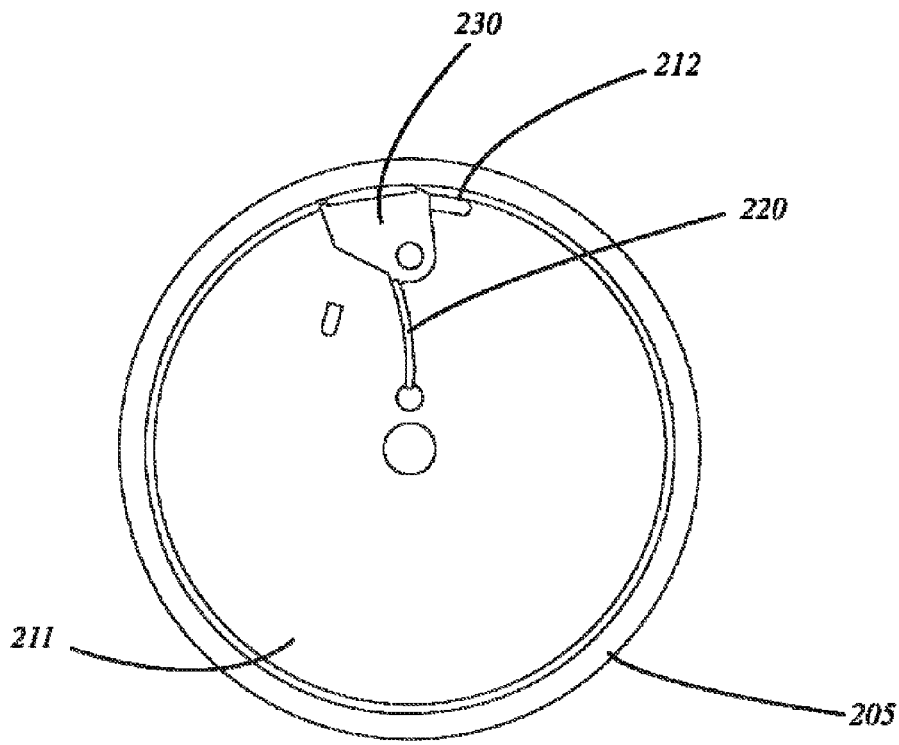

In some embodiments, the brake shoe assembly of a single-acting drum brake may be made to spontaneously further engage the drum upon first contact with the drum. This may be advantageous, for instance in reducing the cost of the assembly by providing a high braking torque while eliminating the need for a large spring. For example, in another embodiment, a single acting drum brake as illustrated in FIGS. 2A and 2B includes a stationary drum 205 and a rotating assembly 210 constrained to rotate coaxial with the axis of the drum 205. The drum may be made of cast iron, aluminum alloy, or other common engineering materials that are sufficiently rigid and strong. The rotating assembly 210 includes a chassis 211 carrying a flexible trigger plate 220 and a brake shoe 230 pivotably coupled to the chassis 211. The trigger plate may be formed of sheet spring steel, stainless steel, or another stiff, flexible material. The trigger plate is constrained at its radially inboard end by a mating socket formed in support 218 about which it pivots. The brake shoe may optionally carry pad 231. Pad 231 may be formed of commercially available composition brake pad material, or another material exhibiting friction.

In the 'cocked' state, the shoe 230 is held in a radially inward position and prevented from contacting the drum by axial compression in trigger plate 220, which engages a socket on the shoe and exerts a force radially outward on the shoe, which is this urged to rotate counterclockwise until it rests against stop 219, which is mounted to the chassis. When the chassis rotates, the force on the shoe arising from centripetal acceleration is borne by axial compression in trigger plate 220. At the desired engagement speed of the brake, the axial compression in trigger plate 220 is insufficient to maintain the radially inward position of the shoe, and trigger plate 220 further compresses, allowing the shoe 230 to pivot outward to contact drum 205. Upon initial contact, friction between pad 231 and drum 205 causes brake shoe 230 to further pivot outward into the 'engaged' configuration shown in FIG. 2B, where it slows the rotating assembly 210 by mechanical friction. When the shoe moves into the engaged position, the rotation of the shoe moves trigger plate 220 through a metastable center position and into a new stable configuration, whereupon it provides force radially outward to maintain shoe 210 in the engaged position. A second stop 212 mounted on the chassis prevents overtravel of shoe 230 and carries a portion of the load arising from friction between the shoe and the drum. The brake will then remain in the engaged configuration until it is inspected and reset by an operator. The operator may reset the brake by forcing shoe 230 back into the cocked position.

The desired engagement speed may be modified in several ways. Increasing the thickness of trigger plate 220 or increasing its width normal to the plane of FIG. 2 will increase the force applied to shoe 230, increasing the engagement speed. Conversely, increasing the axial length of trigger plate 220 or increasing the mass of shoe 230 will decrease the engagement speed. While in the foregoing description trigger plate 220 takes the form of a piece of metallic sheet, other materials and other forms capable of delivering force when axially compressed could be readily substituted. For example, a similar function could be achieved by replacing trigger plate 220 with a helical compression spring. Different trigger mechanisms that provide a retentive force that is overcome at a desired rotational speed may be used in further embodiments.

Figure 3A:
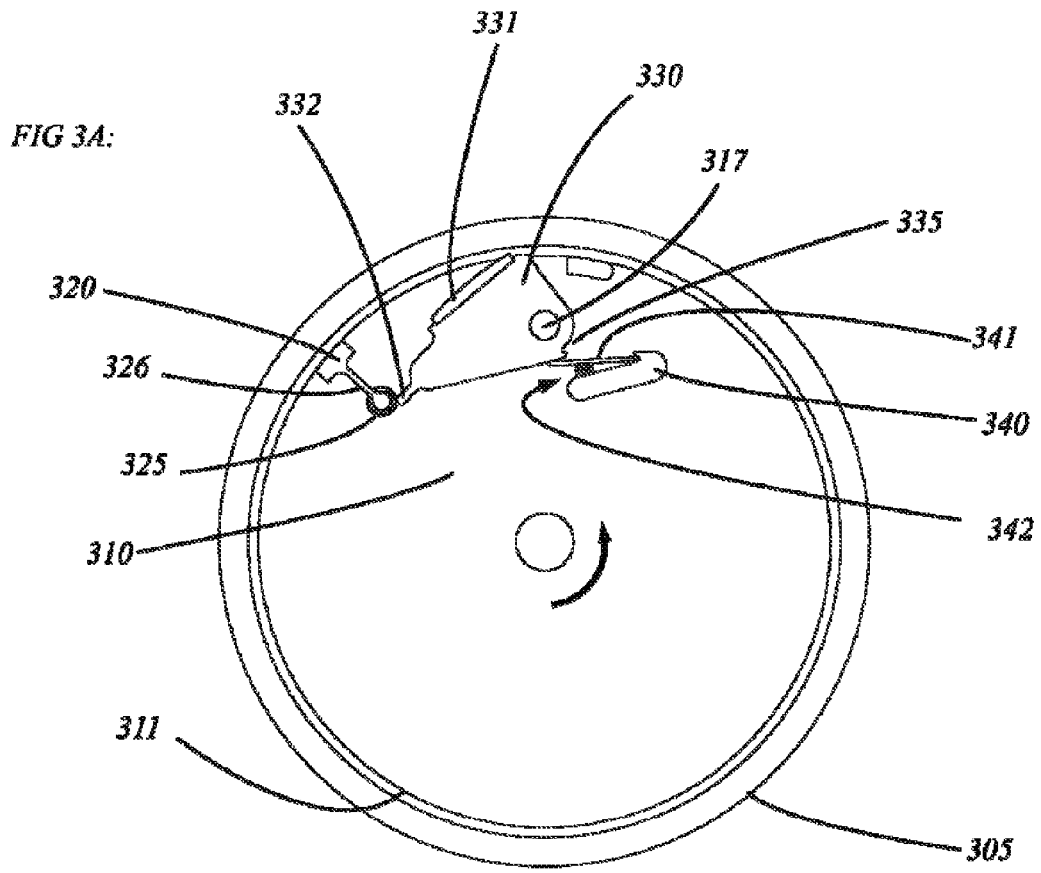
FIGS. 3A and 3B are axial views showing a similar single-acting rotary drum brake with a shoe which is restrained by a trigger mechanism comprising a bearing mounted on a flexure, and further comprising a latch to maintain the shoe in the engaged position, once released by the trigger mechanism according to an example embodiment.
Figure 3B:
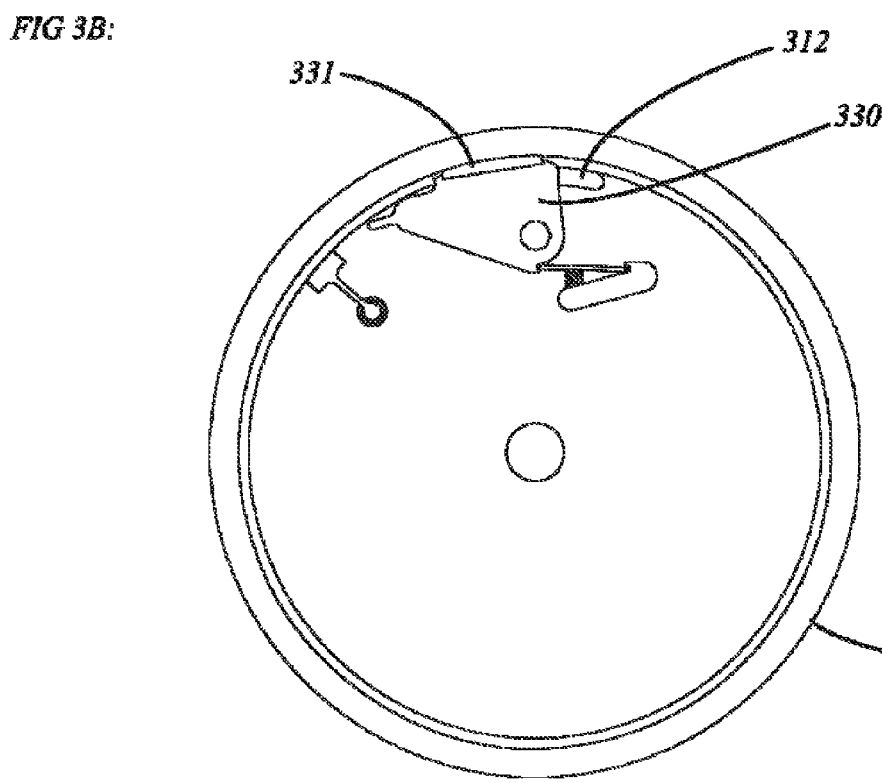

In another embodiment as illustrated in FIGS. 3A and 3B, a single-acting drum brake includes stationary drum 305 and rotating assembly 310 constrained to rotate coaxial with the axis of the drum. The drum may be made of cast iron, aluminum alloy, or other common engineering materials. The rotating assembly comprises a chassis 311 carrying a trigger assembly 320, a brake shoe 330 pivotably coupled to the chassis 311 about a pivot point 317, and a spring-loaded latch assembly 340. The brake shoe may optionally carry a pad 331, and is fashioned with tab 332 which engages the trigger assembly 320. Pad 331 may be formed of commercially available composition brake pad material, or another material exhibiting friction.

In the 'cocked' state as shown in FIG. 3A, the shoe 330 is prevented from contacting the drum by the trigger assembly 320, which comprises a low-friction rotary bearing 325, for instance a deep-groove ball bearing, mounted at a compliant end of a flexure 326. The end of the flexure opposite bearing 325 is rigidly coupled to chassis 311. When the chassis 311 rotates, the force on the shoe 330 arising from centripetal acceleration is borne by bearing 325, and the load is carried to the chassis by flexure 326. At the desired engagement speed of the brake the force applied by tab 332 via bearing 325 causes flexure 326 to deflect sufficiently to allow passage of tab 332. Shoe 330 is thus released to swing radially outward to contact drum 305. Upon initial contact, friction between pad 331 and drum 305 causes brake shoe 330 to further pivot outward into the 'engaged' configuration shown in FIG. 3B, where it slows the rotating assembly 310 by mechanical friction.

The collective behavior of tab 332 bearing 325 and flexure 326 (and that of other similar mechanisms, for instance the flexible trigger plate 220 of the previous figure, and others) described herein may be described as an over-center mechanism, in that it may be forced over a metastable center position into a sprung or cocked state where it will remain until sufficiently perturbed to pass through the center position. More generally, mechanisms with similar behavior may be termed bistable, in that the mechanism has two stable states and will tend to remain in whatever state it is in, unless it is sufficiently perturbed to traverse it into the other stable state, in which case it will remain in that second state. This behavior is advantageous for use as a trigger, and any such mechanism may be described herein as a trigger mechanism. While mechanical methods are described herein, a similar result could be achieved by other methods, for instance by attaching a piece of ferromagnetic material to shoe 330 and retaining the shoe with a permanent magnet, with the arrangement providing a predictable breakaway three.

When the shoe 330 moves into the engaged position, the rotation of the shoe permits a latch 341 to swing outward at the urging of a latch spring 342 positioned between the latch 341 as part of assembly 340, engaging a catch feature 335 on the shoe, thus locking the shoe in the engaged position. A stop 312 mounted on the chassis prevents overtravel of shoe 330 and carries a portion of the load arising from friction between the shoe and the drum. The brake will then remain in the engaged configuration until it is inspected and reset by an operator. The operator may reset the brake by retracting latch 341 and forcing shoe 330 back into the cocked position.

The desired engagement speed may be modified in many ways. For instance, increasing the thickness of flexure 326 or decreasing its length will increase the engagement speed, and vice versa. Conversely, increasing the mass of shoe 330 will decrease the engagement speed.

In some embodiments, the amount of braking torque delivered by the braking mechanisms may be made relatively insensitive to variations of size and form that will inevitably arise in manufacturing a multi-part assembly. Such parameter insensitivity may be achieved by introducing a degree of compliance in the structure of the shoe or in another element of the brake mechanism. FIG. 4A shows a drum brake including shoe 430, which is optionally provided with a pad 431, for instance of composite brake pad material, and constrained as before by trigger assembly 420. Shoe 430 is restrained as before by trigger assembly 420. At the desired engagement speed of the brake, the force on shoe 430 owing to centripetal acceleration overcomes the restraining force of the trigger assembly, and the shoe swings out to first engage drum 405 as indicated in FIG. 4B.

Shoe 430 is provided with an integral compliant flexure comprised of two thin-walled U-shaped protrusions 433, 434. Parts with geometries of this type may be economically produced in aluminum alloys such as 6061 or 6005 by extrusion in continuous lengths, and subsequent cutting to the desired length. Reasonable estimates of the compliance of a flexural element of given length and thickness may be calculated using beam theory. In the case of complex flexure geometries, commercial Finite Element Analysis (FEA) packages such as ANSYS or COSMOS may be readily used to provide a more accurate prediction of compliance.

While flexures with uniform thickness are shown, it may be advantageous to employ flexures with variable thickness depending on the local stress, so as to provide the maximum possible compliance within a given volume. While flexures are shown, other means of providing increased compliance in the shoe assembly could be substituted. For instance, a sheet of rubber could be positioned between shoe 430 and pad 431. Further, while the added compliance shown as an element of the shoe assembly, compliance could be added at any point in the 'force circuit', that is, the path by which the force provided by the shoe on the drum is returned to the drum through the chassis, shaft, bearings, et cetera. For instance, the drum could be elongated axially to increase its compliance.

In some embodiments, the shoe 430 may be made to further engage the drum 405 spontaneously upon first contact with drum 405, once released by trigger assembly 420. FIG. 4C shows a force diagram superimposed on a detail view of the brake of FIGS. 4A and 4B at the moment of first contact, with assembly 410 rotating counterclockwise. Upon contact between shoe 430 and drum 405, drum 405 exerts a radially inward force 461 approximately sufficient to check the outward motion of shoe 430 and confine it to uniform rotary motion about the axis of assembly 410. Force 461 can also be considered as approximately balancing the fictitious 'centrifugal body force' 460 arising on shoe 430 as seen in a rotating reference frame fixed to assembly 410. Radial force 461 gives rise to a tangential friction force 462 which will be equal to the radial force multiplied by the coefficient of friction between pad 431 and drum 405. If the resultant force 463 of radial force 461 and tangential force 462 fills to the right of pivot axis 413 as indicated in the diagram, resultant force 463 will exert a clockwise torque on shoe 430 about its pivot axis 413, further pivoting it and impelling it into the engaged position of FIG. 4B. The rotation of the shoe is once again checked at the desired engagement position by stop 412 coupled or integral with the chassis, and spring loaded latch assembly 440 prevents the shoe from disengaging the drum via latch 441, spring 442 and catch 435. The brake will then remain in the engaged configuration until it is inspected and reset by an operator. The operator may reset the brake by retracting latch 441 and forcing shoe 430 back into the cocked position.

The shoe 430 may be sized so as to interfere slightly with the drum 405 when in the engaged position, such that the flexures in the shoe must compress in order for the brake to engage. "Interfere" is used here in the mechanical engineering sense, that being the linear distance by which the two parts are designed to occupy the same space, necessitating that one or both deflect when the design is assembled. If the values of mechanical compliance and interference of the structure are known, the expected braking torque can be estimated as follows:

$$\tau = \frac{r\delta\mu}{c}$$

Where $\tau$ is the braking torque (in newton-meters), r is the radius of the drum (in meters), $\delta$ is the design interference between the pad and the drum (in millimeters) $\mu$ is the dimensionless coefficient of coulombic friction between the pad and the drum, and c is the compliance of the entire force circuit between the pad and the drum (in millimeters of deflection per newton of normal force). In this way, the desired level of braking torque may be maintained despite variations in size and form, and also despite wearing away of the pad 431 that may occur upon engagement.

Figure 5A:
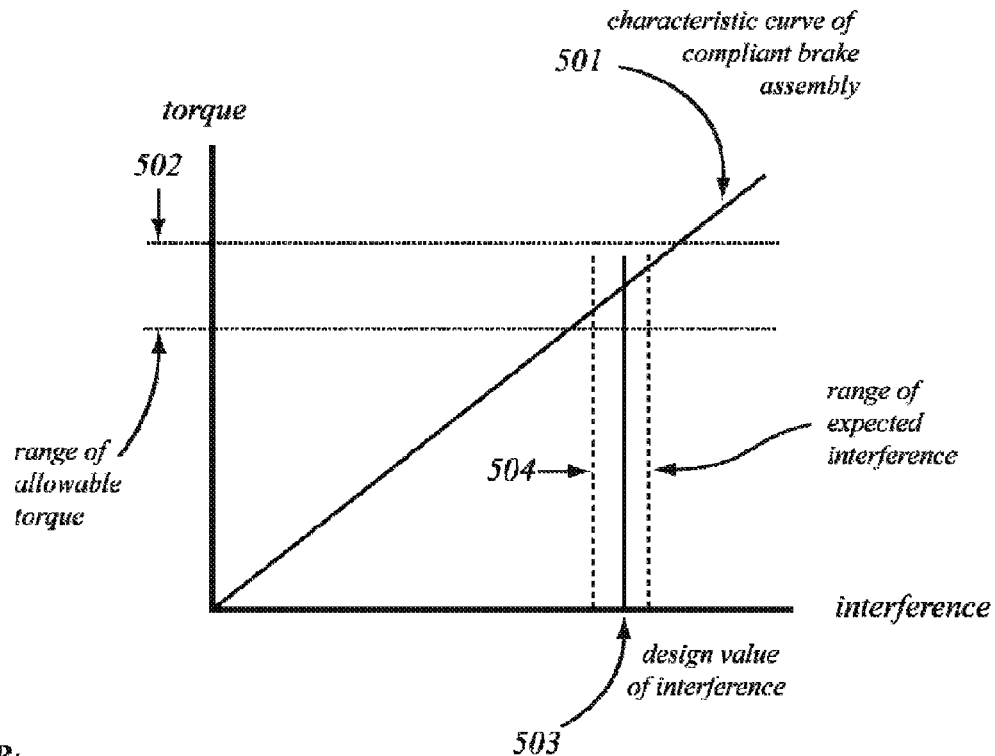
FIGS. 5A and 5B are schematic torque-interference plots for a single-acting drum brake, without and including respectively, plastic yield according to an example embodiment.

In some embodiments, the benefits of compliance in single-acting brake assemblies may be further illustrated with reference to FIG. 5A, a schematic depiction of the relationship between the design interference on the x-axis and the resulting braking torque on the y axis. If all components are within their elastic limit and the friction is coulombic, the relationship between interference and torque will be linear, as depicted by line 501. In a given system there will be a range 502 of braking torque that is acceptable to stop the rotating assembly, with a lower limit defined by the driving torque which must be overcome, and an upper limit defined by the strength of various components in the system, for instance the torsional strength of shafts. The designer then selects a design value for the interference 503 such that the torque level achieved is within the allowable range. The designer recognizes that the actual interference will deviate from the design value due to inevitable manufacturing variations of size and form in the constituent parts, and further ensures that torque will be within the allowable bounds across the entire range of expected interference 504. It may also be inferred from FIG. 5A that reducing the slope of the characteristic curve will result in a broader allowable range of interference while still maintaining torque within the desired range.

Figure 5B:
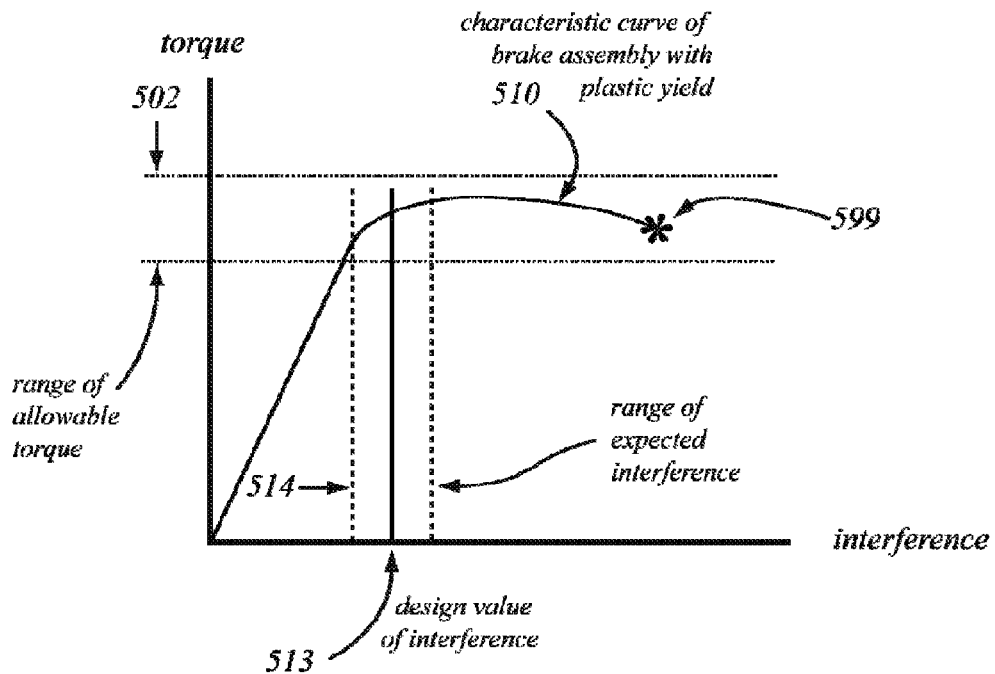

In some embodiments it may not be possible or convenient to simultaneously achieve the desired levels of braking torque and elastic compliance in the shoe, within the confines of practical materials and physical space available. Also, the magnitude of the interference required to achieve the desired torque level with a highly compliant shoe may be unrealistic. In this case it may be desirable to design the flexure to yield plastically in order to limit the braking torque within the desired range. Referring to FIG. 5B, the range of allowable torque 502 is unchanged from FIG. 5A, but the relatively compliant, elastic shoe of FIG. 5A is replaced by a stiffer shoe with flexures designed to yield within the range of allowable torque. The result is a non-linear relationship between interference and torque, schematically depicted as curve 510 with an initial linear slope transitioning to a torque-limiting region within the desired range 502. The design value of interference 513 may be set at a lower value, and the torque is once again within the acceptable band across the range of expected interference, despite the increased stiffness of the shoe. Even if the flexure is designed to yield, a modest level of elastic compliance will still be desirable, to allow the brake to maintain torque as a small amount of pad material is worn away while the rotating assembly is brought to a halt. Care mist be taken to avoid the ultimate yield point 599 of the flexure material, but this may be achieved without difficulty by using ductile materials such as common engineering alloys, for instance 6061 aluminum. It may be noted that designing the flexures to yield (i.e. deform permanently) is likely to render the shoe a single-use part, and thus suited for use as a backup overspeed protection system.

In another embodiment, a single-acting drum brake is illustrated in FIGS. 6A, 6B, and 6C and includes a stationary drum 605 and rotating assembly 610 constrained to rotate coaxial with the axis of the drum. The rotating assembly comprises a chassis 611 carrying a trigger assembly 620 and a brake shoe 630. The shoe is fashioned in the form of a broken ring with an outer diameter in the unconstrained state which is larger than the inner diameter of the drum 605. The brake shoe may be made of a strong springy material, such as carbon steel, and may be wider in the dimension parallel to the axis of rotation than its thickness in the radial dimension. It may be conveniently formed out of readily available bar stock using common metal-forming techniques. In the 'cocked' state, the shoe is constrained by the trigger assembly 620 to a diameter smaller than the inner diameter of drum 605. When the rotating assembly reaches the desired maximum angular speed, the trigger assembly 620 releases the shoe, which moves radially outward to engage the drum and provide braking torque by friction.

A first 'fixed' end 631 of the shoe may be pinned to chassis 611, and may be formed into a shape which allows it to be tangentially constrained to the chassis and renders it capable of transmitting tangential force between the shoe and the chassis, while allowing a measure of radial movement once released to engage the drum. This may be achieved for instance by forming end 631 into a "J" shape, which engages a mating feature 612 in the shape of pin-like protrusion when urged in the counterclockwise direction, and when urged in the clockwise direction disengages the mating feature 612 and contacts ramp 613, which allows end 631 to slide radially outward, ensuring engagement with the drum over the full circumference of the shoe. While a J-shaped shoe end is shown, other configurations may be found advantageous, for instance a formed which fits over a cylindrical pin in the chassis, or a plain curved shoe with a separate part bolted or welded on to provide mechanical interface with the chassis. The chassis may incorporate a crescent-shaped guide 614 which further constrains shoe 630, which would otherwise become somewhat egg-shaped in the cocked state.

The end of the shoe opposite the fixed end (the 'free' end, 632) may include an inwardly (brined feature, which is fastened to trigger assembly 620. The trigger assembly comprises flexible link 621, pin 622, trigger bearing 623, and flyweight 624. The free end 632 of the shoe is fastened by rivets or other suitable means to flexible link 621. Link 621 is preferably formed of material strong in tension, such as steel or stainless steel or other suitable material. The thickness of link 621 is selected to be sufficient to carry the tension necessary to hold shoe 630 inward against guide 614, but not so great that it materially restricts the radial position of bearing 623 in the context of the operation of the trigger assembly. As may be understood by considering the oblique view of FIG. 6B, link 621 is provided with a cutout to admit bearing 623 and to allow the bearing to engage the trigger guide 614, which is fixed to or integral with chassis 611. Link 621 is bored to support pin 622, which in turn listens bearing 623 to the trigger assembly. Depending on the desired rotational speed of engagement of the brake, a flyweight 624 of relatively dense material such as steel, brass, or lead may be fastened to the extreme end of link 621 by crimping or other suitable fastening means.

In the 'cocked' state of FIGS. 6A and 6B, tension in the shoe 630 draws the outer diameter of bearing 623 against a ramped contact surface of trigger guide 614 which makes an acute angle 625 with the line of pull, such that a component of the tension in link 621 forces bearing 623 radially inward against a second, substantially perpendicular face of trigger guide 614 which serves as a stop. As the rotating assembly 610 rotates, the force required to centripetally accelerate the trigger assembly and flyweight is provided by the vector component of the tension in link 621 that is directed radially inward. When the speed reaches the desired trigger speed, the tension in link 621 is no longer sufficient to constrain the trigger assembly, and the bearing rolls radially outward off the end of the trigger guide 614, allowing the shoe to spring outward and engage drum 605, applying torque to bring the rotating drum to a halt. The brake is then in the 'triggered' or 'engaged' state of FIG. 6C, and will remain in the engaged configuration until it is inspected and reset by an operator. The operator may reset the brake by compressing shoe 630 toward the central axis of rotation and returning trigger bearing 623 to the cocked position.

The force (colloquially termed 'centrifugal force') that must be provided to hold the trigger assembly in the cocked state is proportional to the mass of the trigger assembly, proportional to the distance of the assembly from the rotational axis, and proportional to the angular speed raised to the second power. The restraining force available is proportional to the tension in link 621 multiplied by the cosine of angle 625 that the ramp on trigger guide 614 makes with the line of pull. The angle 625 may be adjusted to achieve the desired sensitivity in the trigger, thereby adjusting the angular speed at which the brake engages. Alternatively, the mass of the flyweight may be varied. The flexibility of link 621 prevents shoe 630 from applying moments to the trigger assembly which might influence the balance of forces at the trigger.

As seen FIG. 6C, bearing 623 has escaped trigger guide 614, allowing shoe 630 to relax outward toward its unconstrained state, causing it to contact drum 605, thereby providing torque to slow the rotating assembly.

While the trigger mechanism described above will trigger in either direction, the brake shoe itself exhibits different behavior depending on direction of rotation. If the rotating assembly rotates clockwise as seen from the perspective of FIG. 6C, the braking torque that results from engagement will be linearly proportional to the force of engagement between the shoe and the drum, and also linearly proportional to the coefficient of friction between the shoe and the drum. On the other hand, if the assembly rotates counterclockwise, the force applied by shoe against the drum at the free end will be progressively amplified circumferentially along the length of the shoe. The braking torque that results will then be linearly proportional to the force of engagement between the shoe and the drum, but exponentially proportional to the included wrap angle of engagement 690, and also exponentially proportional to the coefficient of friction between the shoe and drum materials. This nonlinear behavior is known as the 'capstan effect'.

The capstan effect operates to amplify the torque resulting from compression of a flexible member within an internal bore. At the expense of nonlinear sensitivity to the design variables of wrap angle and coefficient of friction, a relative amplification of braking torque may be achieved. For wrap angles on the order of 80% of a full circle and for common materials such as steel on aluminum, a torque multiplication effect on the order of 10× may be readily obtained, permitting the use of a more modest shoe and thus a less robust triggering mechanism to achieve the desired braking torque.

The trigger mechanism consisting of flexible links, trigger bearing, and trigger guide ramp is advantageous from the standpoints of precision, corrosion tolerance, and reduced sensitivity to friction in the mechanism. Other constructions may also be advantageous, for instance due to reduced cost. In some embodiments, the trigger bearing may be replaced by a disk or wheel of suitable low-friction and anti-corrosive material such as bronze or oilite for example, with a plain central bore to act as a bearing against pin 622. In circumstances where a relatively simple, crude trigger may suffice, the rolling aspect of trigger bearing 623 may be dispensed with entirely, and pin 622 may engage trigger guide 614 directly, with release occurring by sliding of the pin on the ramp surface. However, the increased friction in the sliding case will increase the angular speed at which the brake will engage.

In some embodiments, a single-acting centrifugal brake may provide high resistance to corrosion, stiction, and other failure modes, such that the brake may be expected to operate reliably even after many years in service. This feature may be especially advantageous for use as an emergency brake in wind turbines, which typically are expected to operate reliably for decades. In one embodiment, a single acting drum brake is illustrated in FIGS. 7A, 7B, and 7C. A stationary drum 705 and rotating assembly 710 is constrained to rotate coaxial with the axis of the drum. The rotating assembly includes: chassis or rotor 711 carrying a brake shoe assembly 730 pivotably coupled to the rotor 711, for example by means of a pivot pin 713. Pin 713 may be press-fit into the shoe and provided with one or more deep-groove ball bearings 714 to enable free rotation with a minimum of friction, which bearings may be supported by a protruding tubular feature 715 of the chassis. Deep groove ball bearings 714 may be shielded or sealed and fully packed with long-life grease to prevent ingress of moisture and corrosion. The brake shoe may optionally carry pad 731, and may optionally feature flexures 733, 734 as described above. Shoe 730 is fashioned with tab 732, which supports a trigger flexure pin 736, which is preferably made of a strong, stable, dimensionally accurate material such as centerless ground 17-4 precipitation-hardened stainless steel.

As can be seen more clearly in FIG. 7B, trigger flexure pin 736 may extend axially substantially beyond the shoe 730, where its free end is positioned adjacent a small trigger bearing 721, for instance a deep groove ball bearing, the inner race of which is fixed to the rotor 711. Bearing 721 may be shielded or sealed and fully packed with long-life grease to prevent ingress of moisture and corrosion. Bearing 721 is positioned such that pin 736 cannot pass freely, but rather must contact and traverse around the outer race of bearing 721 in order to swing radially outward and engage drum 705 (which is not shown in FIG. 7B). At low rotational speeds, the contact between pin 736 and trigger bearing 721 provides sufficient force to centripetally accelerate shoe assembly 730, which is thus constrained in a first, inward position, and is unable to engage the stationary drum 705. As the speed of rotation is continually increased, the increasing centripetal force on pin 736 eventually deflects it sufficiently to pass by the trigger bearing 721, enabling the shoe to swing outward into a second, outward position as illustrated in FIG. 7C, where it engages the drum 705 and brings the rotating assembly to a halt. The outward rotation of shoe 730 is checked by a stop 712 which is integral with rotor 711.

A flexurally compliant, axially rigid, latch 741 formed of a strong stiff corrosion-resistant material such as nickel-plated steel or stainless steel may be affixed to rotor 711 at a suitably formed rib 716 to retain shoe 730 in the outward, engaged position once released. An example latch may be seen more clearly in FIG. 7D. Latch 741 comprises a main body and a thin flexural region 743. At a first end latch 741 is fixed to rib 716 by screws 744 or other suitable means. At a second end, latch 741 is formed to positively engage shoe 730, optionally at detent feature 737, suitably formed to receive the second end of the latch. A latch on formed will exhibit sufficient lateral flexibility to permit the shoe to brush past as moves into the engaged position, while at the same time exhibiting sufficient axial rigidity to prevent the shoe from returning, especially if the latch is shaped such that it is backstopped by rib 716, as shown. The brake will remain in the engaged configuration until it is inspected and reset by an operator. If the shoe has yielded or the pad is significantly worn, the shoe assembly may be replaced. The operator may reset the brake by releasing latch 741 and displacing shoe 730 toward the central axis of rotation until trigger flexure pin 736 traverses past trigger bearing 721 and returns to the cocked position.

The moment about pivot pin 713 that is required to traverse trigger flexure pin 736 past bearing 721 may be varied by adjusting the degree of mechanical interference between the pin and the bearing, or by modifying the lateral stiffness of the pin at the point of contact with the outer race of the bearing. By analysis it may be derived that the lateral stiffness of pin 736 is linearly proportional to the elastic modulus of the pin material, directly proportional to the fourth power of the pin's diameter, and inversely proportional to the third power of its free length. By varying these parameters, a wide range of trigger speeds may be achieved.

Figure 8A:
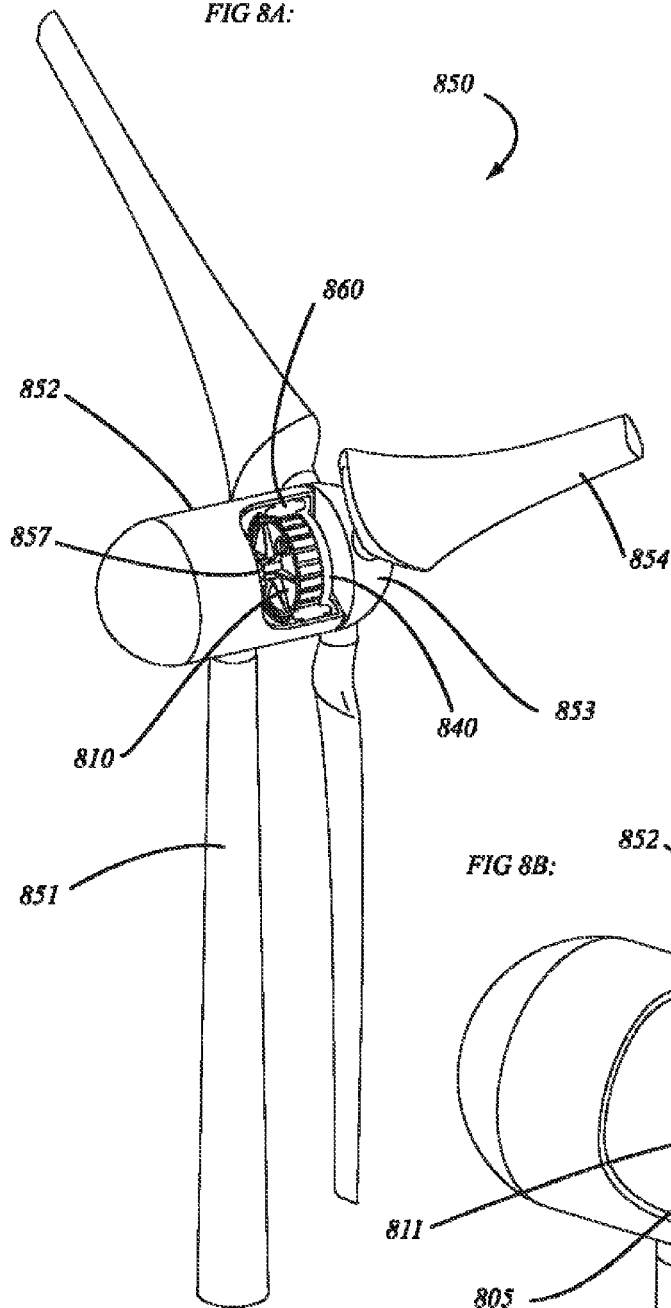
FIGS. 8A and 8B are cutaway perspective views of a wind turbine incorporating a single-acting rotary brake according to an example embodiment.
Figure 8B:
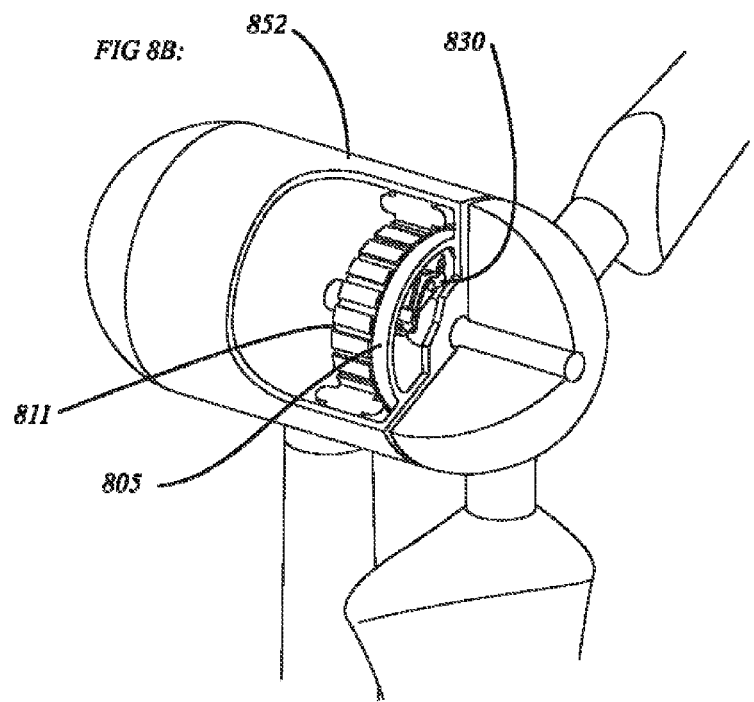

In another embodiment, a wind turbine incorporating a single-acting drum brake is illustrated in FIGS. 8A and 8B.

FIG. 8A presents a partial cutaway overview of wind turbine 850 comprising tower 851, nacelle housing 852, and hub 853 incorporating one or more blades 854. Nacelle housing 852 is pivotably coupled to tower 851, and the assembly consisting of hub 853 and blades 854 is pivotably coupled to nacelle housing 852 about a substantially horizontal axis. Shaft 857 is supported by bearings, and transmits torque from hub 853 to magnet rotor assembly 810. Nacelle housing 852 encloses and protects an electrical generator, for instance a permanent magnet generator comprising stator assembly 860, and magnet rotor assembly 810, comprised of rotor chassis 811 and magnets 840.

In some embodiments, a single-acting brake may be integrated into a wind turbine to act as a safety brake. In some embodiments, the single-acting brake may be integrated with the pre-existing components of the wind turbine to reduce cost. As illustrated in the cutaway view of FIG. 8B, nacelle housing 852 may be provided with a brake drum 805, which in some embodiments may be formed integral with the nacelle housing, for instance as elements of a single casting. Rotor chassis 811 is provided with a single-acting brake assembly, comprising brake shoe assembly 830, a centrifugal trigger, a latch, and other components as illustrated in FIG. 7.

In operation, blades 854 transform kinetic energy in the wind into mechanical energy, which is transmitted to magnet rotor assembly 810, and converted to electrical energy by stator 860. In the event of a failure in the generator or in the electrical loading apparatus coupled to the generator, the rotating assembly may experience a loss of restraining torque, which will cause it to rapidly accelerate to a speed greater than that of normal operation. The centrifugal trigger will then release brake shoe assembly 830 to engage brake drum 805, and the resulting frictional torque will bring the rotating assembly to a halt. The latch will maintain the brake in the stopped state until the fault in the generator system can be corrected. Service personnel can then release the latch, inspect or replace the brake shoe assembly and other components as necessary, and reset the brake to the cocked position.

Some embodiments of self-engaging single-acting centrifugal brakes described herein are effective in providing braking torque in one direction, and are especially suited to devices with a customary direction of rotation, for instance wind turbines or assemblies driven by induction motors. If braking torque is required in both directions, a mirror-image brake assembly could readily be added to many of the embodiments. This would have the added benefit of balancing the rotor assembly without recourse to a counterweight.

While many embodiments described herein present single-acting centrifugal safety brakes in a radial shoe-and-drum configuration, analogous brake assemblies could be readily devised in a disk-and-caliper configuration, with similar self-engaging behavior.

One or more advantages of some of the embodiments described herein are that the centrifugal latching brake system is simple with few moving parts. In some embodiments, the single-acting brake systems are composed of long-life, maintenance-free components, and does not depend on sliding contacts that remain engaged over a long period of time and therefore might gradually corrode together and bind. They may therefore be suitable for high-reliability safety applications. At the same time, they may be simpler and less expensive than other centrifugal safety brakes because they are single-acting, and therefore do not require an automatic release mechanism. Some centrifugal brakes, such as those used in elevator safety systems are complex and have many moving parts. Such brakes have been determined by the inventors to be unsuitable for use in wind energy conversion systems. They incorporate dozens of moving parts and are thus too complex for use in the context of a low cost wind turbine system. Present embodiments provide a simple low cost automatic overspeed brake for wind turbines, especially for small wind turbines with electromechanical stall control as the primary speed control mechanism.

EXAMPLES

1. A brake mechanism for halting a rotating assembly, the brake mechanism comprising;
   a first braking surface;
   a second braking surface; and
   a trigger that releases the second braking surface to engage the first braking surface when the rotating assembly attains a desired rotational speed.

2. The brake mechanism of example 1 wherein the second braking surface comprises at least one shoe assembly, wherein the shoe assembly is pivotably coupled to the rotating assembly, and where the trigger permits passage of the brake shoe assembly from a first, cocked position to a second, engaged position.

3. The brake mechanism of example 2 wherein initial contact of the shoe assembly against the first braking surface impels the shoe assembly further into the engaged position.

4. The brake mechanism of example 2 wherein the assembly further comprises at least one compliant element to increase the compliance of the shoe assembly.

5. The brake mechanism of example 2 wherein at least one element of the brake mechanism is adapted to yield plastically upon engagement.

6. The brake mechanism of example 2 wherein the trigger comprises a bistable mechanism that governs passage of the brake shoe assembly between the cocked and engaged positions.

7. The brake mechanism of example 2 wherein the trigger comprises a flexible member and a rotatable low friction bearing, and where deflection of the flexible member permits passage of said bearing.

8. The brake mechanism of example 7 wherein the flexible member is an elongated bar or pin.

9. The brake mechanism of example 1 and further comprising a latch coupled to maintain the brake shoe in the engaged position.

10. The brake mechanism of example 9 wherein the brake shoe includes a detent to mate with the latch when the brake shoe is in the engaged position.

11. The brake mechanism of example 1 wherein the first braking surface comprises a drum, the second braking surface comprises a shoe coupled to the rotating assembly, and where said shoe has a substantially arcuate form and is held in an elastically deformed state by the trigger, and upon release engages the drum by relaxing toward an unconstrained state.

12. The device of example 11 wherein the direction of rotation is chosen such that the torque delivered by the brake is multiplied, by the capstan effect.

13. The device of example 11 wherein the trigger comprises a flexible member and a rotatable low friction bearing.

14. A device comprising:
   a wind energy conversion device having a rotating assembly;
   a first braking surface;

a second braking surface coupled to the rotating assembly;
means for restraining the second surface from engaging the first braking surface below a selected rotational speed, and for releasing the second surface to engage the first braking surface above the selected rotational speed to halt the rotating assembly.

15. The device of example 14 where in the means for restraining the second surface is a bistable centrifugal trigger.

16. The device of example 14 and further comprising at least one flexure to increase the compliance of the shoe assembly.

17. The device of example 14 and further comprising means for latching the second surface securely in its engaged state until the wind energy conversion de vice can be serviced.

18. A method of halting a rotating assembly, comprising:
providing a first braking surface;
providing a second braking surface coupled to the rotating assembly, said second braking surface positioned proximate to said first braking surface;
restraining the second braking surface with a centrifugal trigger, said trigger releasing when sufficient centrifugal force is applied by rotation of the rotating assembly; and
stopping the rotating assembly by friction between the first and second braking surfaces.

19. The method of example 18 wherein the rotating assembly is part of a wind turbine.

20. The method of example 19 and further comprising:
manually inspecting the wind turbine, replacing components as necessary, returning the brake shoe assembly to the cocked position, and returning the wind turbine to normal service.

The invention claimed is:

1. A brake mechanism for halting a rotating assembly, the brake mechanism comprising;
a first braking surface;
a second braking surface; and
a trigger that releases the second braking surface to engage the first braking surface when the rotating assembly attains a desired rotational speed, wherein the second braking surface comprises at least one shoe assembly, wherein the shoe assembly is pivotably coupled to the rotating assembly about a shoe assembly pivot point, and where the trigger permits passage of the brake shoe assembly from a first, cocked position to a second, engaged position responsive to centrifugal force resulting from the rotational speed such that at least a portion of the second braking surface of the shoe assembly rotates beyond the shoe assembly pivot point into engagement with the first braking surface wherein the shoe comprises a pair of compliant flexures disposed about the shoe assembly pivot point such that the brake mechanism is configured to yield plastically upon engagement with the first braking surface.

2. The brake mechanism of 1 wherein initial contact of the shoe assembly against the first braking surface impels the shoe assembly further into the engaged position.

3. The brake mechanism of claim 2 wherein the assembly further comprises at least one compliant element to increase the compliance of the shoe assembly.

4. The brake mechanism of claim 1 wherein the trigger comprises a bistable mechanism that governs passage of the brake shoe assembly between the cocked and engaged positions.

5. The brake mechanism of claim 1 wherein the trigger comprises a flexible member and a rotatable low friction bearing, and where deflection of the flexible member permits passage of said bearing.

6. The brake mechanism of claim 5 wherein the flexible member is an elongated bar or pin.

7. The brake mechanism of claim 1 and further comprising a latch coupled to maintain the brake shoe in the engaged position beyond shoe assembly the pivot point.

8. The brake mechanism of claim 7 wherein the brake shoe includes a detent to mate with the latch when the brake shoe is in the engaged position.

* * * * *

UNITED STATES PATENT AND TRADEMARK OFFICE
CERTIFICATE OF CORRECTION

| | | |
|---|---|---|
| PATENT NO. | : 9,551,386 B2 | Page 1 of 1 |
| APPLICATION NO. | : 13/885544 | |
| DATED | : January 24, 2017 | |
| INVENTOR(S) | : Polito et al. | |

It is certified that error appears in the above-identified patent and that said Letters Patent is hereby corrected as shown below:

In the Claims

In Column 14, Line 1, in Claim 2, delete "1" and insert --claim 1-- therefor

Signed and Sealed this
Seventeenth Day of April, 2018

Andrei Iancu
*Director of the United States Patent and Trademark Office*